United States Patent [19]
Watanabe

[11] Patent Number: 4,779,141
[45] Date of Patent: Oct. 18, 1988

[54] IMAGE FORMING APPARATUS

[75] Inventor: Junji Watanabe, Yokohama, Japan

[73] Assignee: Kabushiki Kaisha Toshiba, Kawasaki, Japan

[21] Appl. No.: 1,250

[22] Filed: Jan. 7, 1987

[30] Foreign Application Priority Data

Jan. 28, 1986 [JP] Japan .................................. 61-14650
Jan. 28, 1986 [JP] Japan .................................. 61-14651

[51] Int. Cl.$^4$ .............................................. H04N 1/04
[52] U.S. Cl. .................................. 358/286; 353/293; 353/296; 346/76 PH
[58] Field of Search ............... 358/285, 286, 293, 294, 358/296, 297, 299; 346/76 PH

[56] References Cited

U.S. PATENT DOCUMENTS

| | | | |
|---|---|---|---|
| 4,626,924 | 12/1986 | Watanabe | 358/296 |
| 4,652,154 | 3/1987 | Horiya et al. | 346/76 PH |
| 4,672,465 | 6/1987 | Ono | 358/296 |
| 4,683,478 | 7/1987 | Suzaki et al. | 346/76 PH |

Primary Examiner—Edward L. Coles, Sr.
Attorney, Agent, or Firm—Cushman, Darby & Cushman

[57] ABSTRACT

An image forming apparatus comprises a document table for holding a document to be read, and a scanner unit for reading the image of the document while being held. The scanner unit comprises a spot light source illuminates the document and an image sensor receives the light reflected from the document and generates image signals. The image forming apparatus further includes a moving mechanism for moving the scanner unit in a first direction in which the spot light source illuminates the document and in a second direction perpendicular to the first direction, a platen for supporting an image-receiving material, a line-shaped recording head disposed facing the platen, and a controller for controlling the line-shaped recording head to form a reproduced image on the image-receiving material supported on the platen on the basis of the image signals generated by the scanner unit.

15 Claims, 11 Drawing Sheets

IMAGE FORMING APPARATUS

BACKGROUND OF THE INVENTION

1. Field of the Invention

The present invention relates to an improvement of an image forming apparatus such as a scanner printer, etc.

2. Description of the Prior Art

Conventionally, this type of image forming apparatus has a construction such as shown in FIGS. 1 and 2.

FIG. 1 shows a scanner printer. A document table (transparent glass) 2 is provided on the upper surface of a housing 1 for placing documents. On one side of document table 2, there is a positioning scale 3 which serves for positioning of a document A. While above document table 2 there is a document cover 4 whose rear edge is pivotally mounted by a shaft not shown, so permitting it to open or to close on document table 2.

An inlet 6 and an outlet 7 by which paper (image-receiving material) P may enter and leave a serial printer unit (image forming means) 5 that is described below are provided at the upper surface of the rear side of housing 1. A control panel 8 is provided at the upper surface of the front side of housing 1.

In housing 1, a scanner unit (image reading means) 9 for reading the image of a document A placed on document table 2 is provided and serial printer unit 5 which forms images on paper P on the basis of informing read by scanner unit 9 is provided. Scanner unit 9 is located below document table 2 and serial printer unit 5 is located to the rear side of scanner unit 9.

Scanner unit 9 consists of a sensor unit (image pickup means) 10 which picks up the image of document A placed on document table 2 and a drive mechanism (not shown) by which sensor unit 10 is moved reciprocally in a front to rear direction (X1 direction) and to the left and right (Y1 direction).

The structure of sensor unit 10 is such that a document surface is illuminated by a spot light source and light reflected from it is led to and focussed at an image sensor constituted by a charge coupled device (CCD) via a mirror and a lens (optical focussing element).

Serial printer unit 5 has a construction as shown in FIG. 2. A cylindrical platen (image-receiving material supporting means) 11 supports paper P and transports it. Platen 11 is driven at successive set pitches by a pulse motor 13 acting via a reduction gear train 12. In front of and facing platen 11, a thermal print head 14 can be moved parallel to the axis of platen 11 by a head moving means.

In more detail, a shaft 15 is provided parallel to platen 11 and a carriage 16 is slidably mounted on shaft 15. Carriage 16 is connected to a timing belt 17 which is passed around between pulleys 18 and 18 that are provided at near both ends of shaft 15. One of pulleys 18 can be driven by a pulse motor 20 acting via a reduction gear train 19. Carriage 16 carrying thermal print head 14 is moved reciprocally along a line parallel to the axis of platen 11 by the rotation of pulse motor 20.

Thermal print head 14 has heating elements (not shown) which are arrayed in a direction that intersects the line of platen 11 axis at right angles, i.e., parallel to the direction of rotation of platen 11.

A flexible cable 21 has one end fixed by a holder not shown to carriage 16, and a connector member 22 provided at its other end is connected to a connection element (not shown) that is located in the approximate centre of the path along which carriage 16 moves. The heating elements of thermal print head 14 are connected to a head drive circuit (not shown) via the wiring pattern of flexible cable 21.

A paper guide 23 and a paper hold-down roller (not shown) are mounted to the outer periphery portion of platen 11.

If paper P is heat-sensitive paper, images are formed by bringing thermal print head 14 directly against it. If it is plain paper, etc., a ribbon cassette 24 is mounted at the rear side of housing 1 as shown in FIG. 1 and images are produced with a thermal transfer ink ribbon 25 interposed between paper P and thermal print head 14, as shown in FIG. 2.

However, since the arrangement in the above described conventional apparatus provide serial printer unit 5 in housing 1, the print speed is relatively lower than that of a line printer unit. Generally, a line printer unit can print a large number dots per unit time than that of a serial printer unit. Therefore, a recent serial printer unit is developed to perform the high speed print by controlling the printing operation skips the blank portions. However, the above mentioned improved serial printer unit is no match for a line printer unit.

Further, since the arrangement in the above described conventional apparatus is one in which thermal print head 14 is located in front of platen 11, ribbon cassette 24 must be mounted at the rear side of housing 1 as shown in FIG. 1. Or, alternatively, it must be set in a portion of housing 1 interior that is in front of thermal print head 14, i.e., it must be set together with a winding mechanism on carriage 16 for moving thermal head 14.

Both these arrangements hinder production of more compact apparatus, since in the former arrangement in which ribbon cassette is mounted at the rear side of housing 1, the dimensions going towards the rear are larger when a ribbon cassette is in place, while in the latter arrangement in which ribbon cassette is mounted on carriage 16, the depth dimension of housing 1 itself becomes large.

SUMMARY OF THE INVENTION

It is an object of the invention to provide an image forming apparatus which is construction such that the problem mentioned above are solved, which is possible to achieve a high speed image forming operation.

It is another object of the invention to provide an image forming apparatus which is construction such that the problem mentioned above are solved, which is possible to have a compact structure with a small front-to-rear dimension.

According to one aspect of the present invention, there is provided an image forming apparatus including:

means for holding a document to be read;

means for reading the image of the document while being held, the reading means comprises a spot light source illuminates the document and an image sensor receives the light reflected from the document and generates image signals:

means for moving the reading means in a first direction in which the spot light source illuminates the document and in a second direction perpendicular to the first direction;

means for supporting an image-receiving material;

a line-shaped recording head disposed facing the supporting means; and means for controlling the line-shaped recording head to form a reproduced image on the image-receiving material supported on the supporting means on the basis of the image signals generated by the reading means.

BRIEF DESCRIPTION OF THE DRAWINGS

These and other objects and advantages of this invention will become more apparent and more readily appreciated from the following detailed description of the presently preferred exemplary embodiments, taken in conjunction with the accompanying drawings, of which:

FIGS. 3 through 19 show an embodiment of an image forming apparatus according to the present invention, in which;

FIG. 3 is a side view, partially cut away, showing the configuration of line printer unit;

FIG. 4 is an external perspective view;

FIG. 5 is a schematic view of internal construction;

FIG. 6 is a plan view of a drive mechanism;

FIG. 7 is a front view, in longitudinal section, showing a sensor unit portion;

FIG. 8 is a plan view of FIG. 7;

FIG. 9 is a side view, in longitudinal section, of FIG. 7;

FIG. 10 is a plan view showing reading width;

FIG. 11 is a plan view for explaining the reading process;

FIG. 12 is a perspective view showing a line printer unit;

FIG. 13 is an external perspective view illustrating the case where a ribbon cassette is mounted on top of the printer unit;

FIG. 14 is a sectional side view showing the internal construction of a ribbon cassette;

FIG. 15 is a rear side view for explaining the relation between a top plate and a lock mechanism;

FIG. 16 is a perspective view for explaining the relation between a top plate and a lock mechanism;

FIG. 17 is a perspective view for explaining the relation between a take-up reel and a platen;

FIG. 18 is a sectional side view showing a ribbon cassette when it is mounted in place; and FIG. 19 is a block diagram showing the configuration of main elements in a control circuit.

DETAILED DESCRIPTION OF THE PREFERRED EMBODIMENTS

An embodiment of the present invention will now be described with reference to FIGS. 3 through FIG. 19.

Figure 1:
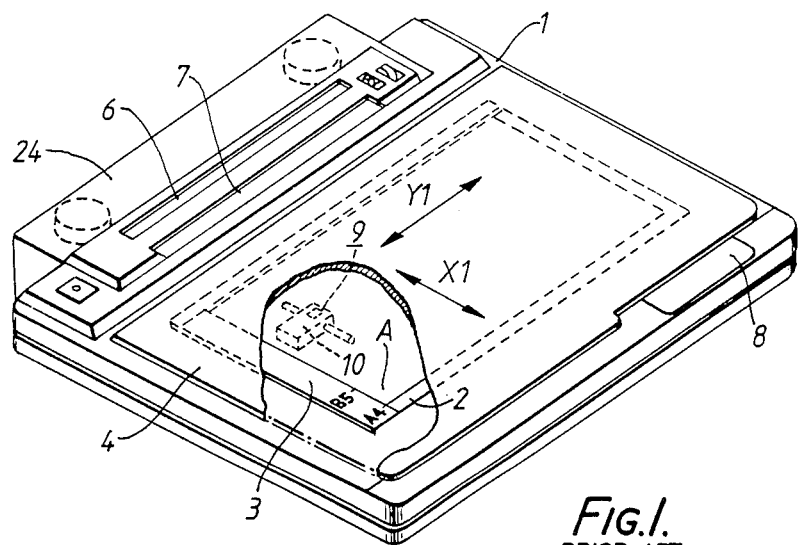
FIG. 1 is an external perspective view, partially cut away, showing a conventional apparatus.
Figure 2:
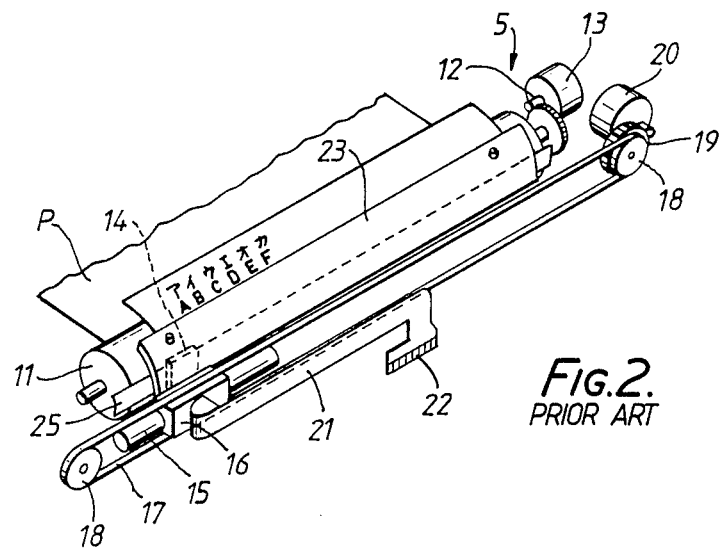
FIG. 2 is a schematic perspective view of serial printer unit in this conventional apparatus.
Figure 3:
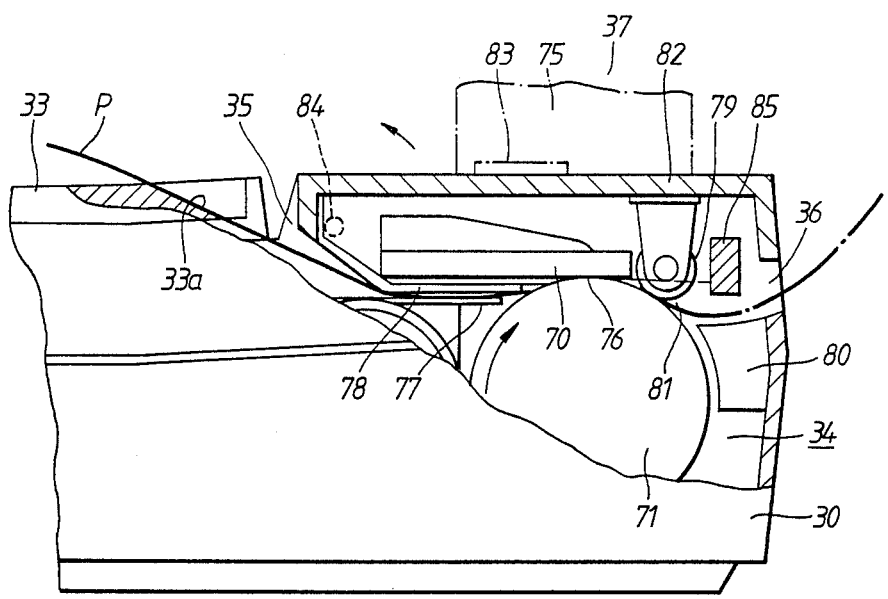
Figure 4:
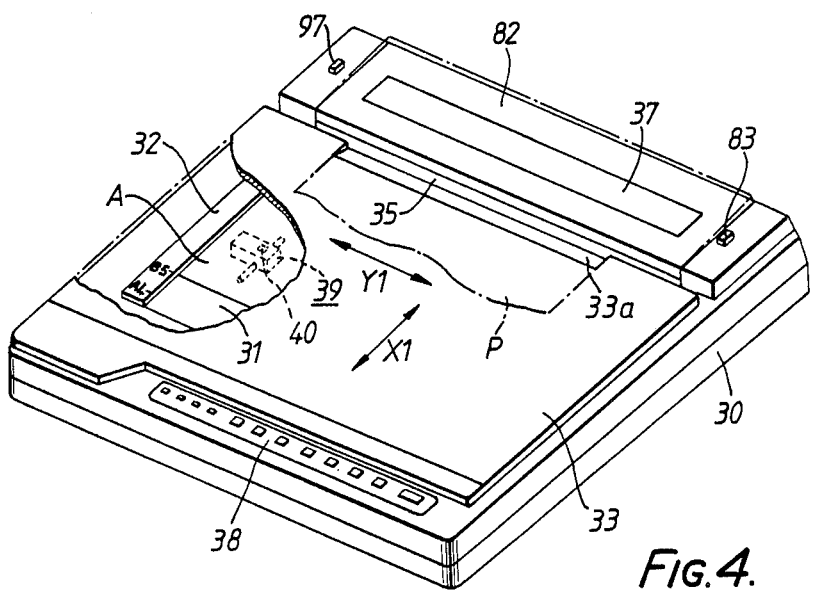

FIG. 3 shows the main structural parts of a scanner printer and FIG. 4 is an external view, partially cut away, of the printer. A housing 30 is formed in the flat box like and has an upper wall and bottom wall. A document table (transparent glass) 31 is provided on the upper surface of the upper wall of housing 30 for placing documents. On one side of document table 31, there is a positioning scale 32 which serves for positioning of a document A. While above document table 31 there is a document cover 33 whose rear edge is pivotally mounted by a shaft not shown, so permitting it to open or to close on document table 31.

An inlet 35 and an outlet 36 by which paper (image-receiving material) P may enter and leave a line printer unit 34 that are described below are respectively provided at the rear side of housing 30 upper surface and in the rear surface of housing 30. A ribbon cassette loading stage 37 is provided at the rear side of inlet 35. A control panel 38 comprising a print switch, stop switch, paper feed switch and copying range specifying switch, etc. is provided at the front edge of housing 1 upper surface. At the rear side of document cover 33 there is a taper portion 33a which is for guiding insertion of paper P and allows copy paper P to be guided smoothly to inlet 35 of line printer unit 34. The sides of taper portion 33a constitute transverse guides for insertion of paper P.

A scanner unit (image reading means) 39, which reads the image of a document A placed on document table 31, and line printer unit 34, which forms an image on paper P on the basis of information read by scanner unit 39, are provided inside housing 30. Scanner unit 39 is located below document table 31 and line printer unit 34 is located to the rear of scanner unit 39.

Figure 5:
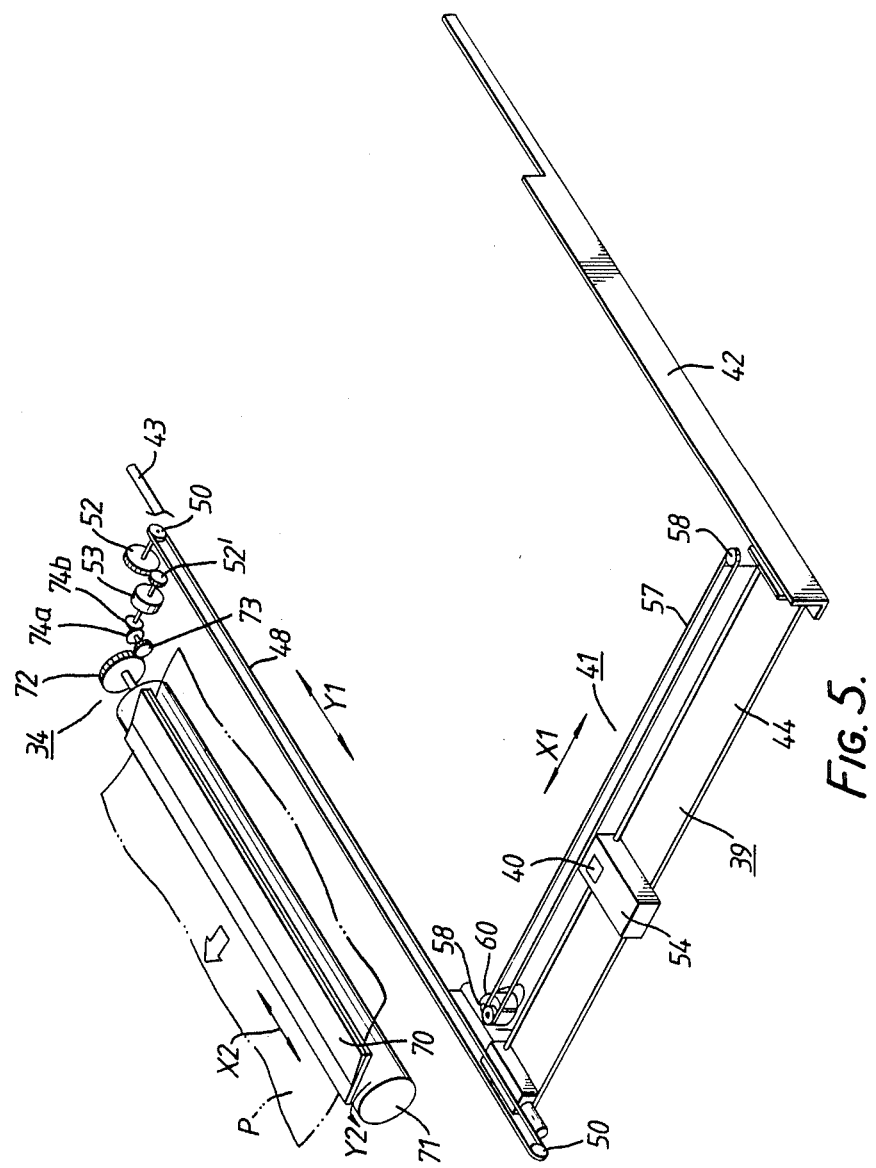

As shown in FIG. 5, scanner unit 39 consists of a sensor unit (image pickup means) 40 which picks up the image of a document on document table 31 and a drive mechanism 41 which causes reciprocal movement of sensor unit 40 in the X1 direction (first direction), going from front to rear, and in the Y1 direction (second direction), going from left to right.

Figure 6:
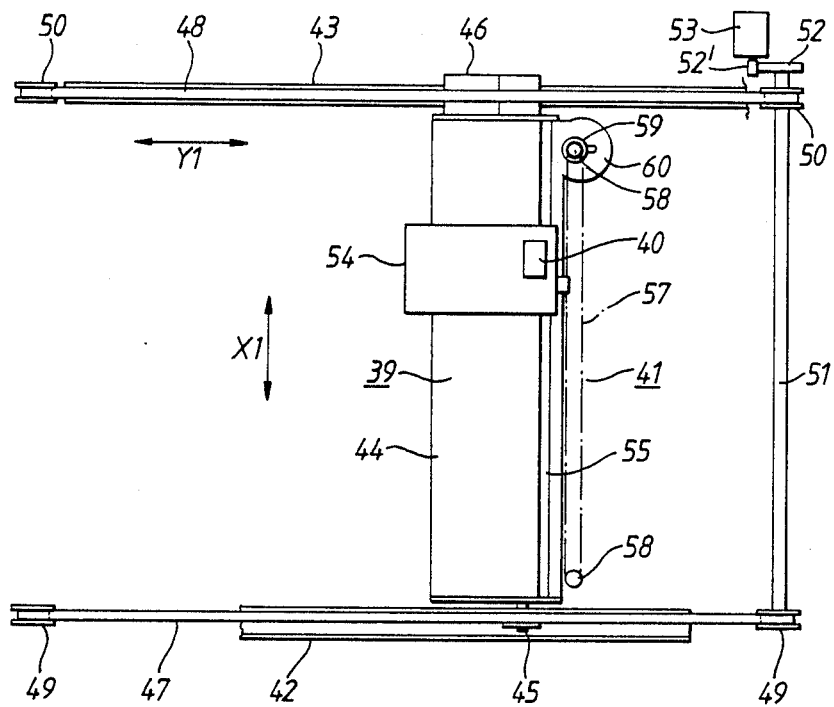

Scanner unit 39 is constructed in the manner shown in FIGS. 5 and 6. That is, a guide rail 42 going in the Y1 direction is provided along the front side of scanner unit 39 inside housing 30 and a guide shaft 43, also going in the Y1 direction, is provided along its rear side. A first carriage 44 straddles the space between guide rail 42 and guide shaft 43. The front edge of first carriage 44 is movable on guide rail 42 via a roller 45 and its rear edge is slidably supported on guide shaft 43 by a slider 46, first carriage 44 thus being freely movable in the Y1 direction. The front edge and rear edge of first carriage 44 are respectively connected to timing belts 47 and 48 which respectively pass around between a pair of pulleys 49 and 49 provided at near the both ends of guide rail 42 and a pair of pulleys 50 and 50 provided at near both ends of guide shaft 43. Pulleys 49 and 50 at one end are mounted on both ends of a shaft 51 which is driven by a first pulse motor 53 acting via a train of reduction gears 52 and 52', the arrangement thus being such that drive of first pulse motor 53 causes first carriage 44 to move reciprocally in the Y1 direction.

A second carriage 54 is supported on first carriage 44. As shown in FIG. 6, second carriage 54 has its right-hand side slidably supported on a shaft 55 that is provided going in the X1 direction on first carriage 44 and its left-hand side slidably supported on the edge of first carriage 44 via an engagement recess portion 56 (FIGS. 7 and 9), whereby it can move freely in the X1 direction. The right-hand side of second carriage 54 is connected to a timing belt 57 that passes around between pulleys 58 and 58 which are located at the front and rear side of first carriage 44 and one of which is driven by a second pulse motor 60 acting via a reduction gear train 59. Thus, drive of second pulse motor 60 causes second carriage 54 to move reciprocally in the X1 direction.

Figure 7:
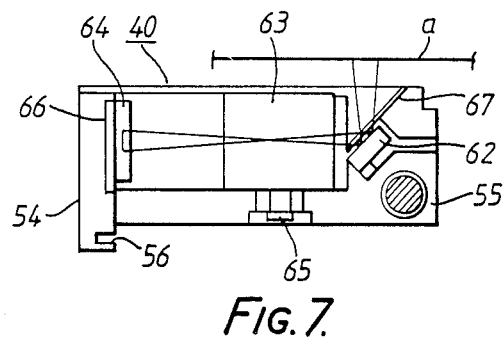
Figure 8:
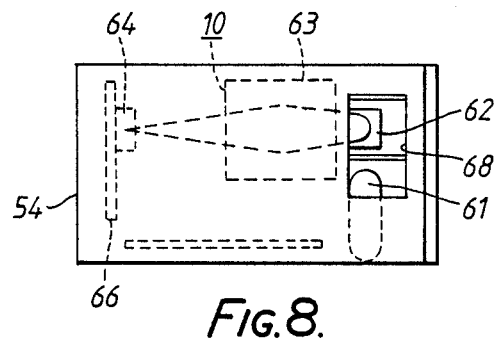
Figure 9:
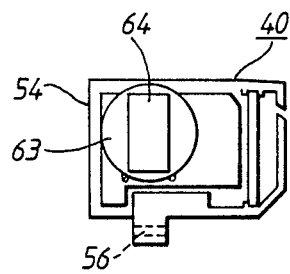
Figure 10:
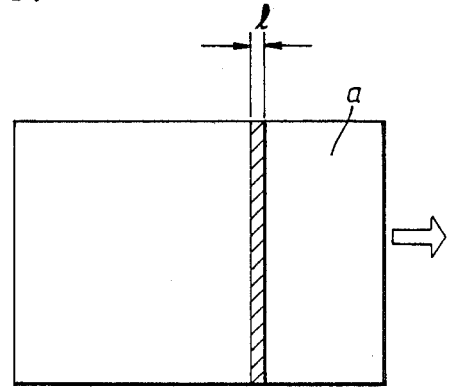

Sensor unit 40 is mounted on second carriage 54 and, as shown in FIGS. 7 through 9, has a construction in which a document surface a is illuminated by a spot light source 61 and light reflected from this surface goes successively via a mirror 62 and a lens (optical focussing element) 63 to be led to and focussed at an image sensor 64 constituted by a charge coupled device (CCD). A screw 65 is operatively provided to lens 63 for adjusting the focus of lens 63. When screw 65 is turned, it causes lens 63 to move along the optical axis. Image sensor 64 is mounted directly on a circuit board 66 so as to minimize noise effects. Mirror 62 is held by a holder 67. Above mirror 62, a window 68 is provided to permit the passing light from document surface Image sensor 64 comprises a plural bit (8 bit) sensor elements. First carriage 44 carrying image sensor 64 is moved in the X1 direction by drive mechanism 41. As a result, a document image is read one line at a time, each line being the width l of image sensor 64 bits, as shown in FIG. 10.

Figure 11:
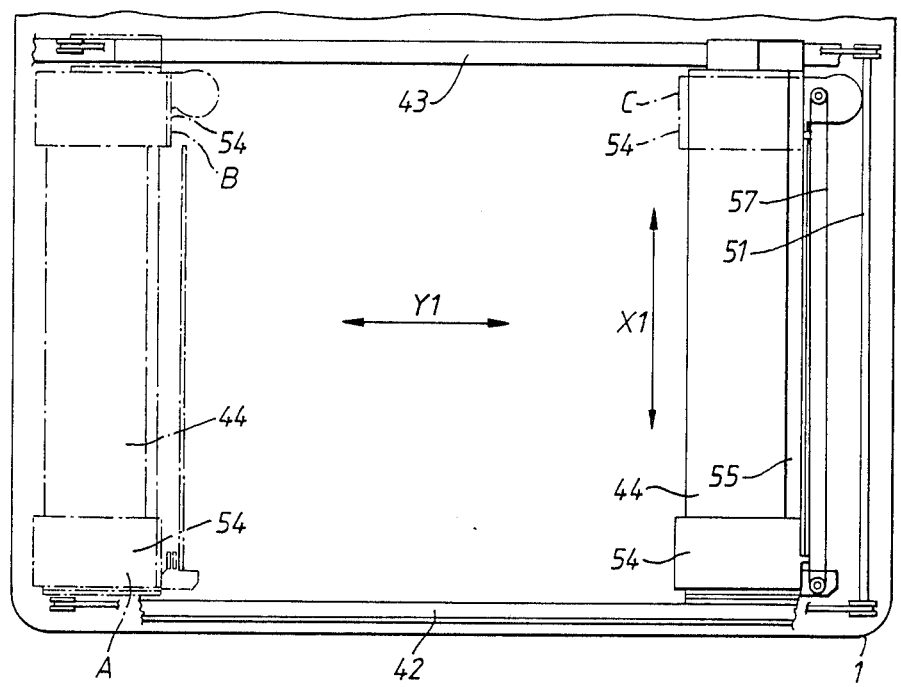

As shown in FIG. 11, reading starts at a front left position A and is effected going in the X1 direction up to a rear position B. On completion of this reading there is a return to the front side and during this return movement, sensor unit 40 is shifted a line reading width l to the right. Repetition of this action results in reading being effected up to a rear right position C.

Figure 12:
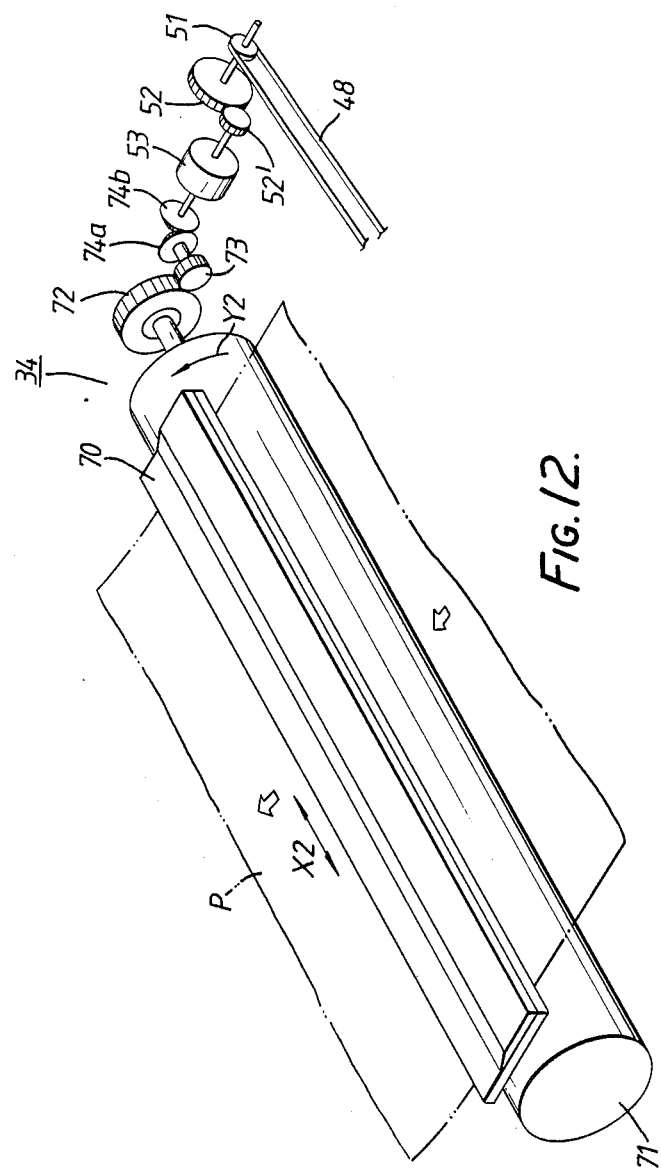
Figure 13:
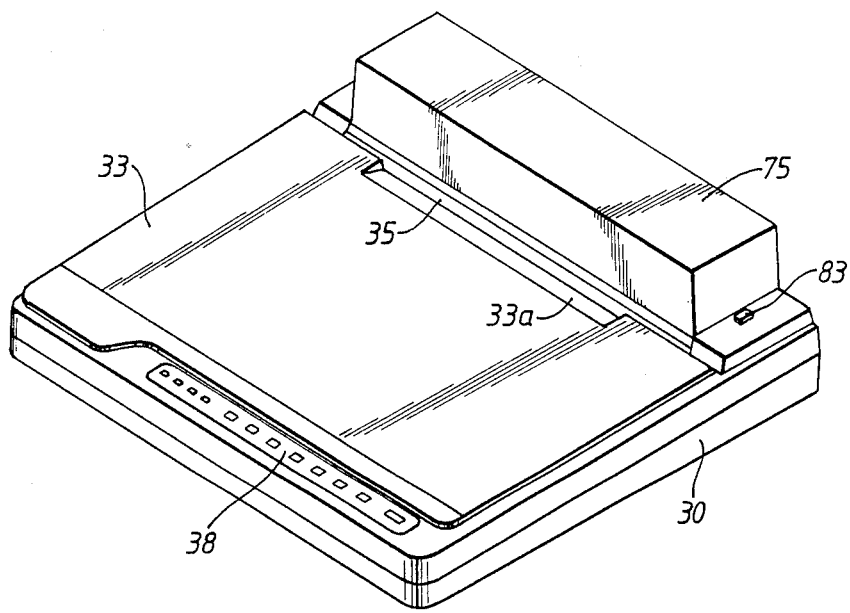

As shown in FIGS. 3, 5 and 12, line printer unit 34 is constituted by a recording head in the form of a line-shaped thermal print head 70 and a cylindrical platen (image-receiving material supporting means) 71.

Paper P is supported and transported by platen 71. Platen 71 is driven in the direction Y2 one set pitch at a time, simultaneously with drive of scanner unit 39 in the Y1 direction, by first pulse motor 53 acting via a train of gears 72 and 73 and a pair of bevel gears 74a and 74b. Line-shaped thermal print head 70 (recording head) extends over the entire width of platen 71 and is disposed facing downwards and facing the upper surface of platen 71.

Thermal print head 70 has a line of heating elements (not shown) which are disposed parallel to the axis of platen 71, i.e., in a direction that is perpendiculer to the direction Y2 of rotation of platen 71. Printing is effected following on from and at the same speed as reading by scanner unit 39. At a peripheral portion of platen 71, there are paper guides 77 and 78 by which paper P is guided from paper inlet 35 to an image forming station 76 between platen 71 and thermal print head 70. At a location that is further on than image forming station 76 in the direction of paper transport, there is a paper press-down roller 79 which presses paper P against platen 71. Further on than paper press-down roller 79 in the direction of paper transport, there is a paper guide 80 which guides paper P to paper outlet 36. These elements together define a transport path 81 going from paper inlet 35 to paper outlet 36.

On depression of a push button 83 in a rear right-hand edge portion of the upper surface of housing 30, spring or similar force causes a top plate 82 that constitutes the top surface of line printer unit 34 to pivot about a pivot point 84 at paper inlet 35 end of top plate 82 and be pivotally displaced anticlockwise as shown in FIG. 3 (in the direction of arrow). As a result, upper paper guide 78, thermal print head 70 and paper press-down roller 79 are moved upwards integrally with top plate 82, so opening paper transport path 81 and permitting paper P that has been inserted via paper inlet 35 to be passed smoothly through image forming station 76. The leading edge of paper P is positioned by coming against a stopper 85 located to the rear of paper press-down roller 79, further insertion being prevented when it contacts this stopper 85.

Figure 18:
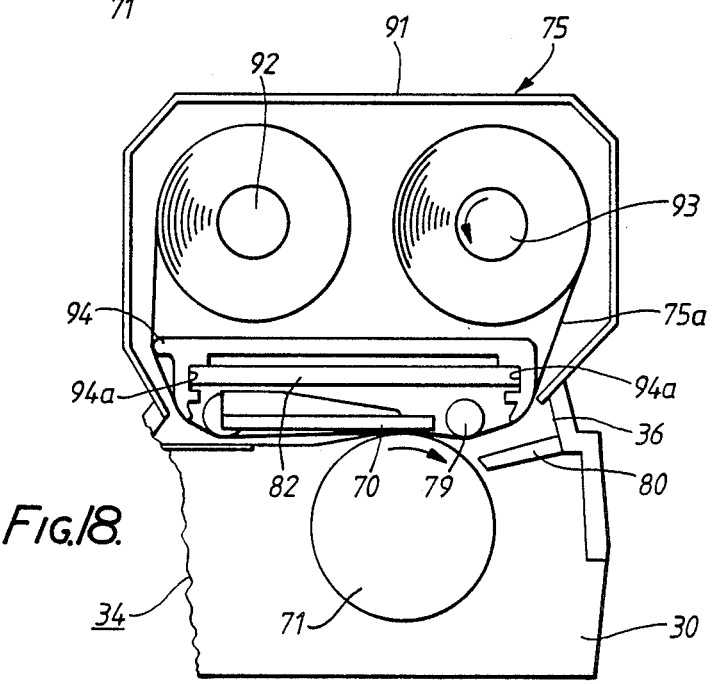

In setting of paper P in place, its side edges are positioned by the sides of taper portion 33a of document cover 33 and paper P is easily set parallel to platen 71 by simply being inserted, with the positions of its side edges thus controlled, until it comes against stopper 85. If paper P is heat-sensitive paper, images are formed by bringing thermal print head 70 to face paper P directly, without mounting a ribbon cassette 75. If paper P is plain paper, etc., to form images, ribbon cassette 75 is mounted beforehand in the upper portion of line printer unit 34 and a thermal transfer ink ribbon 75a is brought between paper P and thermal print head 70, as shown in FIG. 18.

Figure 14:
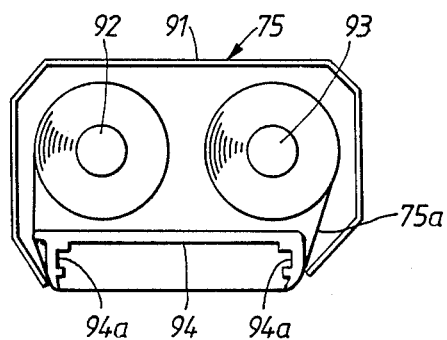

As shown in FIG. 14, ribbon cassette 75 has a feed-out reel 92, a take-up reel 93 and a guide hub 94 in a cassette housing 91, and guide hub 94 guides thermal transfer ink ribbon 75a in a manner such that an intermediate part thereof is exposed at the lower surface of cassette housing 91. The width of thermal transfer ink ribbon 75a is approximately equal to the length of thermal print head 70. Guide hub 94 has guide grooves 94a for guiding it along top plate 82.

Figure 15:
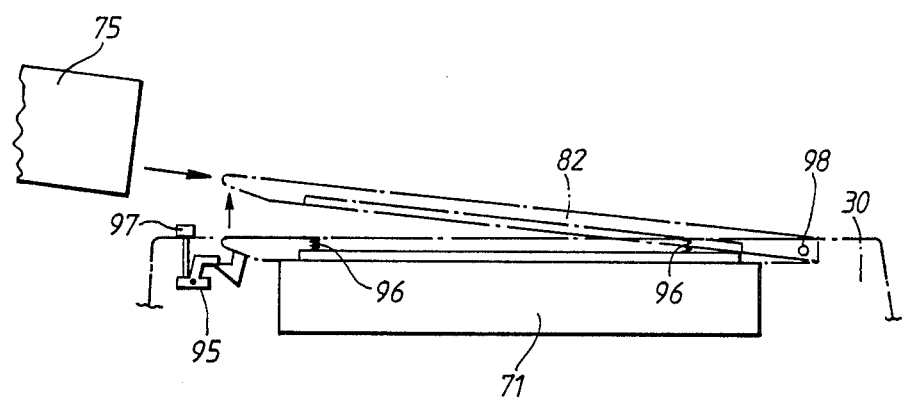
Figure 16:
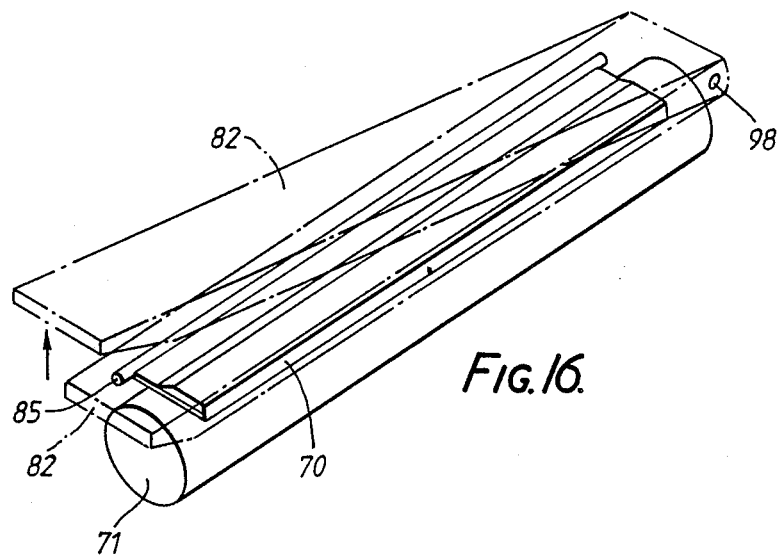

As shown in FIGS. 15 and 16, depression of a push button 97 provided in a rear left-hand portion of the upper surface of housing 30 releases locking by a lock mechanism 95, whereupon top plate 82 is pivoted open about a pivot point 98 by the resilient force of a spring 96. As a result, upper paper guide 78, thermal print head 70 and paper press-down roller 79 are moved upwards integrally with top plate 82. When this is done, guide grooves 94a provided in guide hub 94 of ribbon cassette 75 are engaged by being pushed in along top plate 82, as shown in FIG. 17, and further downward pushing results in ribbon cassette 75 being mounted on top of line printer unit 43, as shown in FIG. 18.

Figure 17:
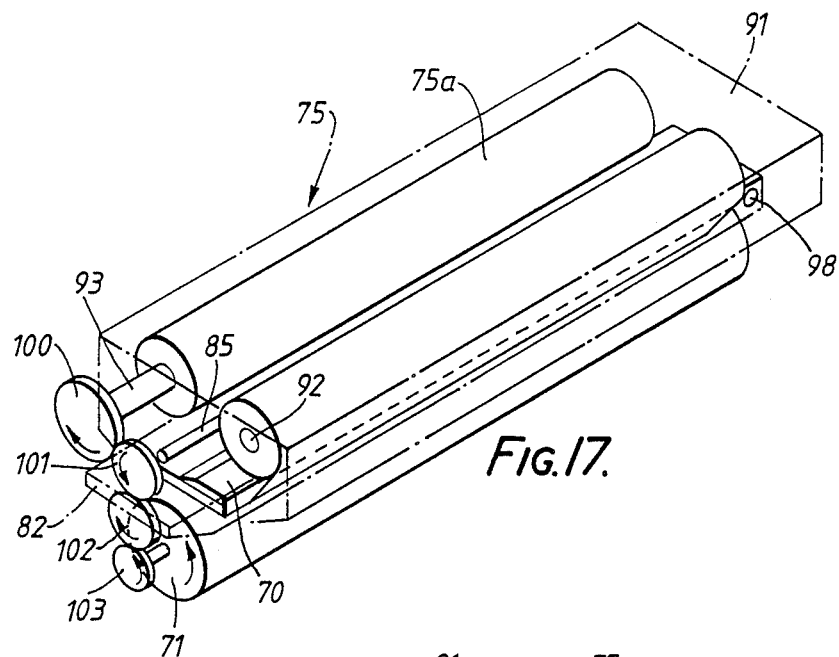

As shown in FIG. 17, a gear 100 axially supported by take-up reel 93 is connected via gears 101 and 102 to a gear 103 axially supported by platen 71, whereby rotation of platen 71 is accompanied by rotation of take-up reel 93, and hence movement of thermal transfer ink ribbon 75a.

Figure 19:
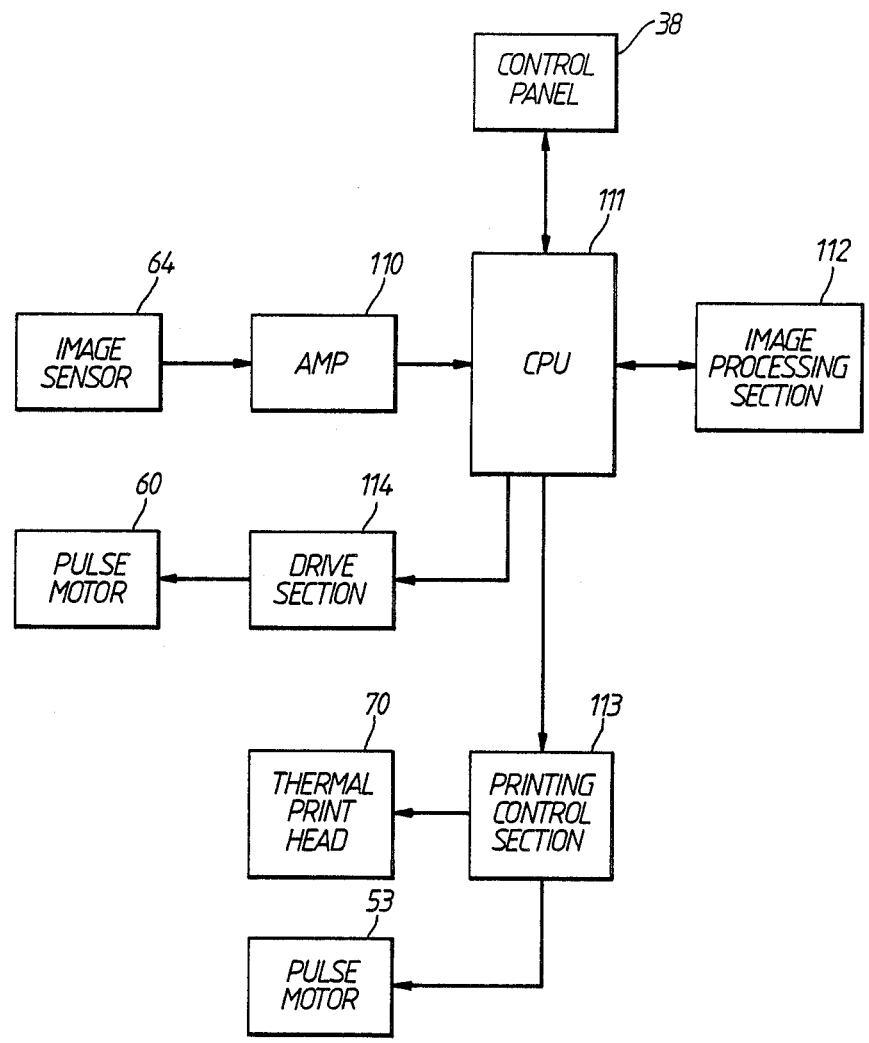

The control circuit will now be described with reference to FIG. 19. Image information output from image sensor 64 is supplied via an amplifier 110 to a CPU 111. CPU 111 effects overall control and stores the image information supplied from image sensor 64 in an image processing section 112. Image processing section 112 is a buffer memory for temporary storage of several lines of image information that has been processed by image sensor 64. When image information is stored in image processing section 112, CPU 111 reads it out one line at a time and outputs it to a printing control section 113. Printing control section 113 drives thermal print head 70 in accordance with each line of signals with which it is supplied and, while doing this, effects one line drive of pulse motor 53, which effects simultaneous displacement of sensor unit 40 (in the Y1 direction). CPU 111 also effects control of a drive section 114 which drives pulse motor 60.

The various sections noted above are actuated by a power supply (not shown) constituted by cells or batteries, etc.

The operation of the above structure will now be described. First, a description will be given with reference to the case where paper P is heat sensitive paper. The operator places a document A on document table 31, puts document cover 33 over it and then presses push button 83. Hereupon, one side of top plate 82 rises is shown in FIG. 4, this being accompanied by integral upward displacement of upper paper guide 78, thermal print head 70 and paper press-down roller 79. Next, the operator, making use of taper portion 33a of document cover 33, inserts paper P until it comes against stopper 85.

Next, the operator pushes top plate 82 down and actuates a print switch (not shown) on control panel 38. Hereupon, CPU 111 drives pulse motor 60 in the forward direction, so causing sensor unit 40 to move from point A (see FIG. 11) and go in the X1 direction. Light from spot light source 61 illuminates document A and light reflected from document A is led successively via mirror 62 and lens 63 and illuminates image sensor 64. Whereby an image corresponding to document A is projected onto image sensor 64. Image sensor 64 converts this image to electrical signals and outputs these signals in bit units via amplifier 110 to CPU 111, so resulting in storage of these signals in image processing section 112 by CPU 111.

When illumination has been effected up to point B, CPU 111 stops pulse motor 60, so stopping sensor unit 40. Next, 8 lines of image information having been stored in image processing section 112, CPU 111 reads this information out one line at a time and outputs it to printing control section 113, which in response drives thermal print head 70 in accordance with each line of signals with which it is supplied. As it also drives pulse motor 53, platen 71 is rotated in the Y2 direction an amount corresponding to one line and sensor unit 40 is moved the equivalent of one line in the Y1 direction. When transfer of 8 lines of information has been completed, image sensor 40 is again moved in the X1 direction from point A and reads the document. As a result, heating is effected in correspondence to thermal print head 70 drive, so effecting formation of the image of document A onto paper P.

Next, the case where paper P is plain paper will be described. The operator presses push button 97. This releases locking by lock mechanism 95 and so top plate 82 opens in the manner shown in FIG. 16. As a result, upper paper guide 78, thermal print head 70 and paper press-down roller 79 are moved upwards integrally with top plate 82. Next, the operator engages guide grooves 94a provided in guide hub 94 of ribbon cassette 75 by pushing them along top plate 82 in the manner shown in FIG. 15 and then pushes ribbon cassette 75 down and causes top plate 82 and ribbon cassette 75 to be locked in place by lock mechanism 95. As a result, ribbon cassette 75 is mounted on top of line printer unit 34 and running the length of thermal print head 70 is covered with the width of thermal transfer ink ribbon 75a as shown in FIGS. 17 and 18.

Next, the operator places a document A on document table 31, puts document cover 33 over it and then presses push button 83. Hereupon, one side of top plate 82 rises together with ribbon cassette 75, this being accompanied by integral upward displacement of upper paper guide 78, thermal print head 70 and paper press-down roller 79. Next, the operator, making use of taper portion 33a of document cover 33, inserts paper P until it comes against stopper 85.

Next, the operator pushes top plate 82 (or ribbon cassette 75) down and actuates a print switch (not shown) on control panel 38. Subsequent operation is similar to that in image formation onto heat sensitive paper and an image corresponding to document A is transferred onto paper P as the result of transfer in correspondence to thermal print head 70 drive and using thermal transfer ink ribbon 75a.

As described above, a duplicate copy of a document is produced on copy paper by installing a line-shaped thermal print head facing the upper surface of a platen, reading the image of the document by causing a sensor unit which picks up the image by illuminating the document on a document table by means of a spot light source and picking up light radiated from the document to move in a front to rear direction (X1 direction) and in a left to right direction (Y1 direction) and driving the thermal print head in accordance with read information. The apparatus is designed for reduction of the number of parts, since left to right (Y1 direction) movement of the sensor unit and rotation of the platen are effected by drive from a single motor. Also, there is design for simplified control, since the apparatus has at least a line-shaped thermal print head and a buffer memory able to store one line of recording data, one line of data is read out at the sensor unit and during transfer effected by the line-shaped thermal print head in correspondence to the read data, the sensor unit is moved the equivalent of one line in the Y1 direction.

Although description of the above embodiment was given with reference to the case where a take-up reel in a ribbon cassette is driven in correspondence to rotation of a platen, the apparatus is not limited to this but it is also possible to provide the ribbon cassette with a drive means that effects drive by batteries and use this drive means to rotate the take-up reel. Also, the arrangement may be one in which drive power of the motor for driving the platen rotates the take-up reel by being transmitted to it by gears, etc.

Further, the thermal transfer ink ribbon in the ribbon cassette may be a ink ribbon in which Y (yellow), M (magenta) and C (cyan) or Y (yellow), M (magenta), C (cyan) and B (black) inks are successively disposed in the direction of lines. In these cases, color ink transfer can be effected.

What is claimed is:

1. An image forming apparatus comprising:
   means for holding a document to be read;
   means for reading the image of the document while being held, said reading means comprises a spot light source illuminates the document and an image sensor receives the light reflected from the document and generates image signals;
   means for moving said reading means in a first direction in which said spot light source illuminates the document and in a second direction perpendicular to the first direction;
   means for supporting an image-receiving material;
   a line-shaped recording head disposed facing said supporting means; and
   means for controlling said line-shaped recording head to form a reproduced image on the image-receiving material supported on said supporting means on the basis of the image signals generated by said reading means.

2. An image forming apparatus according to claim 1, wherein said line-shaped recording head is disposed facing the upper side of said supporting means.

3. An image forming apparatus according to claim 1, wherein said line-shaped recording head includes a thermal print head.

4. An image forming apparatus according to claim 1, wherein said supporting means includes a cylindrical platen.

5. An image forming apparatus according to claim 1, wherein said moving means includes a first driving means to move said reading means in the first direction and a second driving means to move said reading means in the second direction.

6. An image forming apparatus according to claim 5, wherein said second driving means includes means for moving said supporting means to transport the image-receiving material supported on said supporting means.

7. An image forming apparatus according to claim 1, wherein said controlling means includes memory means for storing image information data obtained by said reading means scans the image of the document in the first direction, said image information data correspond to the image signals generated by said reading means.

8. An image forming apparatus according to claim 1, wherein said controlling means further controls said moving means to move said reading means the equivalent of one line in the second direction during forming the reproduced image.

9. An image forming apparatus comprising:
a housing having an upper wall and a bottom wall;
a document table provided on the outer surface of the upper wall for holding a document thereon;
means for reading the image of the document while being held on said document table, said reading means comprises a spot light source illuminates the document and an image sensor receives the light reflected from the document and generates image signals;
means for moving said reading means in a first direction in which said spot light source illuminates the document and in a second direction perpendicular to the first direction;
means for supporting an image-receiving material;
a line-shaped recording head disposed facing said supporting means;
a cassette enclosing an image forming material;
means for mounting said cassette to the upper wall portion of said housing and the image forming material interposed between said image-receiving material and running the length of said line-shaped recording head, said cassette is disposed above said line-shaped recording head;
means for controlling said line-shaped recording head to form a reproduced image on the image-receiving material supported on said supporting means on the basis of the image signals generated by said reading means.

10. An image forming apparatus according to claim 9, wherein said mounting means includes:
a top plate pivotally provided at the upper wall portion of said housing; and
a guide hab provided at said cassette to slidably engage with said top plate.

11. An image forming apparatus according to claim 9, wherein said line-shaped recording head is disposed facing the upper side of said supporting means.

12. An image forming apparatus according to claim 10, wherein said line-shaped recording head is mounted at said top plate.

13. An image forming apparatus according to claim 9, wherein said line-shaped recording head includes a thermal print head.

14. An image forming apparatus according to claim 9, wherein said supporting means includes a cylindrical platen.

15. An image forming apparatus according to claim 14, wherein said top plate includes:
a pivot point provided at the near of one end of said cylindrical platen in the longitudinal direction.

* * * * *